United States Patent [19]
Auer, Jr. et al.

[11] 3,819,932
[45] June 25, 1974

[54] MULTI-COMPUTER AUTOMATIC VEHICLE CONTROL SYSTEM

[75] Inventors: John H. Auer, Jr., Fairport; Donald B. Marsh, Rochester; John J. DiPaola, Penfield, all of N.Y.

[73] Assignee: General Signal Corporation, Rochester, N.Y.

[22] Filed: Mar. 22, 1972

[21] Appl. No.: 237,197

[52] U.S. Cl. ............... 246/1 R, 246/187 B, 340/163
[51] Int. Cl. .............................................. B61l 21/10
[58] Field of Search .......... 246/187 B, 1 R; 340/163

[56]  References Cited
UNITED STATES PATENTS
3,268,727   8/1966   Shepard ..................... 246/187 B
3,699,522   10/1972  Haner ........................ 340/163 X Primary Examiner—Gerald M. Forlenza
Assistant Examiner—George H. Libman
Attorney, Agent, or Firm—Milton E. Kleinman

[57]  ABSTRACT

A multi-computer automatic vehicle control system for controlling vehicles travelling along path rails in a route plan from a central control station. A data communication link transmits vehicle performance reports from each of the vehicles to the central control station and transmits vehicle command messages from the central control station to the vehicles. On each of the vehicles is an on-line control system for decoding vehicle command messages and assembling performance report messages and a speed control unit for controlling acceleration and braking of the vehicles. An on-line control system in the vehicle includes logic circuitry for receiving and decoding the vehicle command message, recognition circuitry to detect the addressed vehicle and control circuitry for synchronizing the transfer of data within the on-line control system in each vehicle. A computer set in the central control station provides speed control commands and identity words which are included in the command message to the vehicles.

21 Claims, 6 Drawing Figures

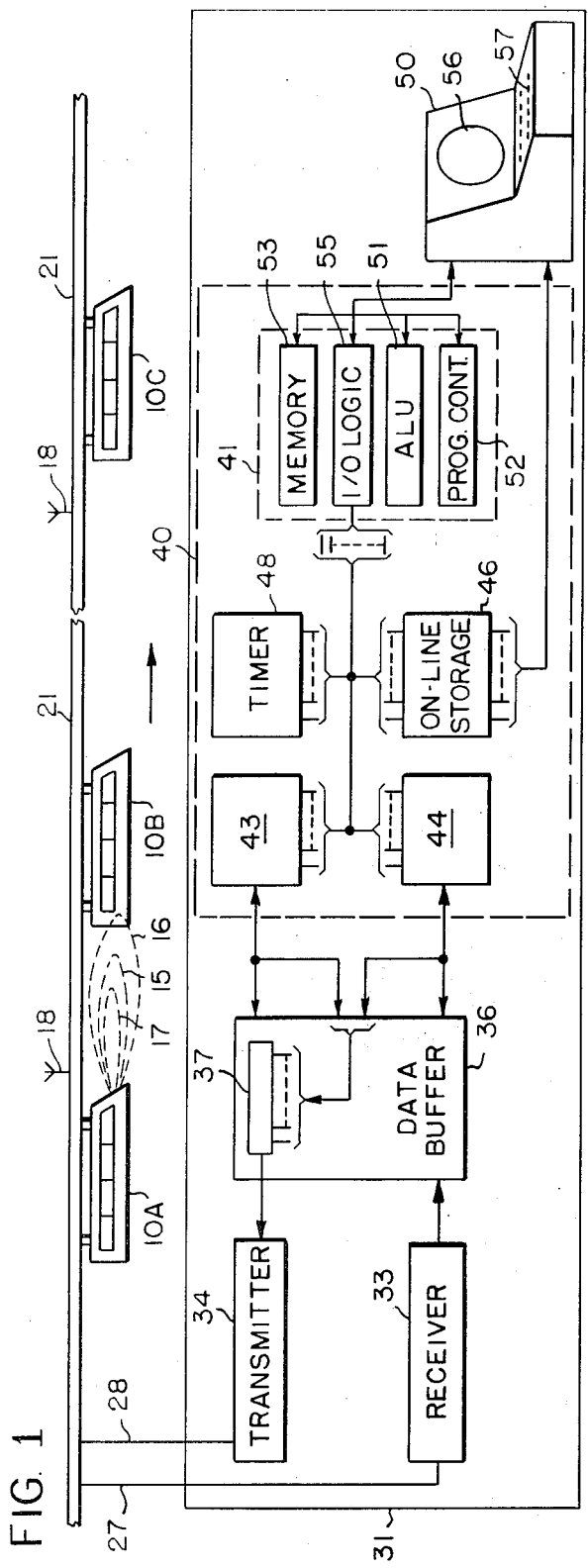
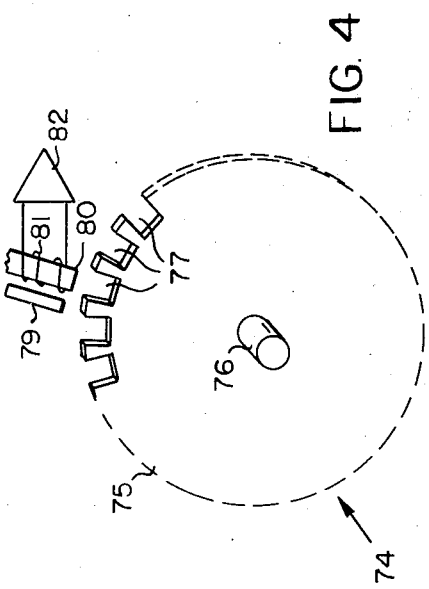
FIG. 1
FIG. 2
FIG. 4

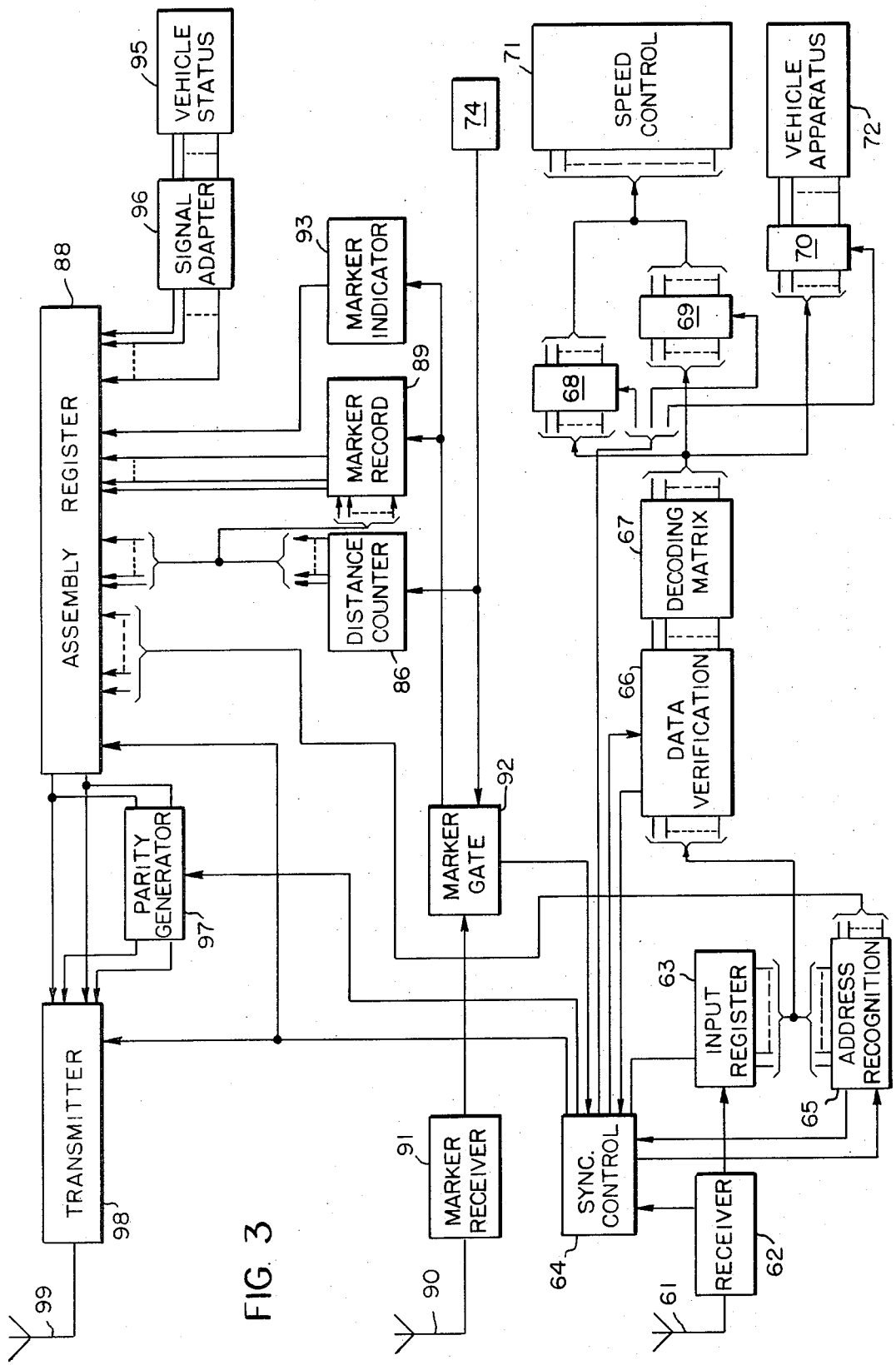

MULTI-COMPUTER AUTOMATIC VEHICLE CONTROL SYSTEM

BACKGROUND OF INVENTION

This invention relates to a multi-computer automatic vehicle control system and, more particularly, to a computer supervised system controlling a plurality of vehicles travelling along the path rails of a route plan in a metropolitan area by projecting forward safety zones preceding each vehicle to attain maximum vehicle speeds when vehicles are operating in close proximity to each other.

Vehicle control systems have been developed to a high degree in the railroad industry where automatic signalling systems and centralized traffic control are used to provide the train operator with information to control trains in accordance with a predetermined schedule for train movement. Automatic signalling systems for railroads are often based upon insulated fixed lengths of track, which are known as "block-lengths." The occupancy or non-occupancy of such block-lengths by a moving train indicates the approximate location of such train and trains are controlled safely by only permitting one train in each block length. Furthermore, communications with a particular train are accomplished by communicating with a selected block-length that includes only one particular receiving vehicle.

Obviously, the use of fixed block-lengths tends to limit the traffic density on the tracks as the block-lengths are often several miles long and the train is considered to be within a block-length from the time the first car of the train first enters to the time the last car of the train leaves such block. This is not a desirable limitation even in the railroad industry where a limited number of trains are operated over long distances of track on generally fixed time schedules. The railroads have obtained some increase in possible traffic density by dividing block-lengths into theoretical sections and requiring a train travelling through a block length to report its sectional position in such block length to a central office. For example, if a train reports that it is halfway through its block-length, the central office signals a following train to permit it to enter the first section of the preceding block-length. Although this does enable trains to be dispatched in closer succession, the improvement has not been sufficient for the use of such a train control system in a metropolitan people-mover system. Such a people-mover system requires a large number of automatically controlled vehicles moving about a limited route plan and it is necessary to achieve a sufficient density of such vehicles to accommodate rush-hour crowds with closely spaced vehicles stopping at each station in rapid succession.

SUMMARY OF INVENTION

In accordance with the features of this invention which provide improvement to the above-mentioned inadequacies of train control system, the vehicle control system is comprised of a plurality of vehicles commonly controlled from a computer set in a remote central control station. A data communication link transmits vehicle performance reports from each of the vehicles to the central control station and transmits vehicle command messages from the central control station to the vehicles. An on-line control system for decoding vehicle command messages and assembling performance report messages is included in each vehicle. The on-line control system includes logic circuitry for formatting vehicle command messages transferred from the central control station to the vehicles. An address recognition circuit tests an identity word included in the transmitted command messages to recognize messages intended for the particular receiving vehicle. In response to each vehicle command message that is recognized as intended for the particular vehicle, a performance report message is formatted in the vehicle's on-line control system and transmitted via the data communication link to the central control station. The transmitted vehicle performance report includes acquired telemetry data characteristic of distance travelled by the vehicle along the route plan and the vehicle's movement from stationary markers located along the route plan.

A computer set in the central control station receives the vehicle performance reports from the controlled vehicles and prepares vehicle command messages in response for each of the vehicles. The computer set includes a supervisor computer and two safety computers operatively connected to each other and to a commonly connected bulk storage memory unit. The supervisor computer is programmed to compute the position of the reporting vehicles in the route plan, ascertain each vehicle's proximity to a speed limiting restriction along the route plan, and computes the command velocity for each of the vehicles. The safety computers operate essentially in parallel and limit the computed command velocity in accordance with limit flag signals set by the supervisory computer and a forward safety zone computed by safety computer. The two safety computers independently verify and validate a command velocity included as a speed control signal in the vehicle command message transmitted by both safety computers to a data buffer for transmission by the data communication link to the vehicles.

Accordingly, one of the objects of this invention is to provide a vehicle control system that obviates the limitations of the prior described train control systems.

Another object of the present invention is to provide an improved highly flexible on-line control system for use in an automatically operated vehicle controlled by a remote located digital computer in a real time environment.

It is a further object of the present invention to provide programmed control for a multi-computer system organized to provide computer validated command messages transferred from the central control station to the vehicles.

It is a still further object of the present invention to provide a system enabling a plurality of vehicles to proceed along a route plan at maximum vehicle speeds in rapid succession when the vehicles are in close proximity to each other.

It is a further object of the present invention to provide an on-line control system in each of the vehicles for use in conjunction with a computer controlled vehicle operation, which on-line system provides recognition circuitry to identify particular messages intended for the receiving vehicle.

For a better understanding of the present invention together with other and further objects thereof, reference is directed to the following description taken in connection with the accompanying drawings, while its scope will be pointed out in the appended claims.

BRIEF DESCRIPTION OF DRAWINGS

FIG. 1 is a block diagram representation of an automatic vehicle control system wherein vehicles are operatively connected and automatically controlled from a central control station;

FIG. 2 illustrates a format of the vehicle command message transmitted from the central control station to the vehicles and the vehicle performance report message transmitted from each vehicle to the central control station;

FIG. 3 is a schematic representation of an on-line vehicle control system in each of the vehicles shown in FIG. 1;

FIG. 4 is a view of a coded disc with cooperating magnetic circuitry mounted on an axle common to a vehicle's drive wheel;

DESCRIPTION OF THE PREFERRED EMBODIMENTS

Figure 5:
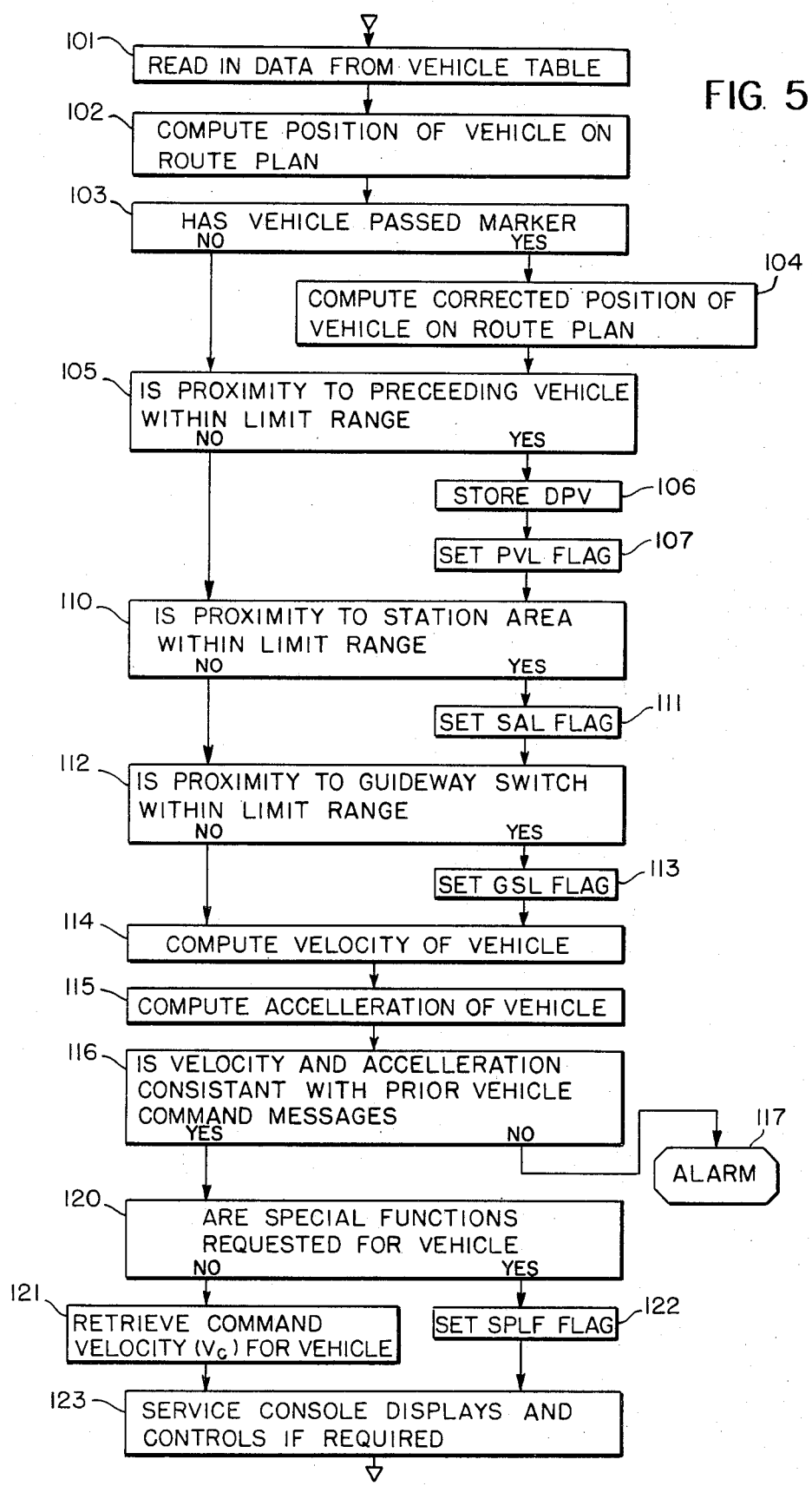
FIG. 5 is an illustrative flow chart of the programmed operation of a supervisor computer in the central control station.

The overall view of a multi-computer automatic vehicle control system is shown in FIG. 1. The vehicle control system includes vehicles 10A, 10B and 10C (collectively referred to as vehicles 10) travelling along a path rail 21 and connected via indicated data transfer lines 27 and 28 of a data communication link to a central control station 31. A route plan providing a circuitous path for the vehicles is formed by connecting several path rails 21 together in a pattern corresponding to the transportation objectives of the system. Signalling markers 18 are spaced along the path rails 21 of the route plan at predetermined locations emitting signals that are received by the individual vehicles 10 as the vehicle's receiving antenna is in line with each signalling marker 18. Binary data is transferred with vehicles 10 on data transfer lines 27 and 28 connecting to a receiver 33 and a transmitter 34, respectively, at the central control station 31 in the form of two high frequency signals, the change of the signal from one frequency to the other indicating the presence of a corresponding 0 or 1 binary digit. This non-return-to zero (NRZ) communication format enables a high rate of data transmission by decreasing the number of signal transitions, i.e., frequency shifting, necessary to transmit a block of data. The signals received by a receiver 33 are decoded and serially transferred to a data transfer buffer 36 wherein the data is parity checked and formatted in word-lengths for parallel transfer to a computer set 40.

The computer set 40 includes a supervisor computer 41, and two safety computers 43 and 44 commonly connected to an on-line memory storage unit 46, such as a magnetic disc memory, and a timer 48 synchronizing the operation of the three computers 41, 43 and 44 and providing the computers with clocking signals to record the time elapsed during control of the vehicles 10. Data transferred from the receiver 33 through the connecting data buffer 36 is inputted to safety computers 43 and 44. Data transferred from safety computers 43 and 44 is temporarily stored in a shift register 37 in the data buffer 36. The data in shift register 37 forms a vehicle command message that is serially transferred to transmitter 34 for transmission on transfer line 28 to the vehicles 10. The format of a vehicle command message 22 is shown in FIG. 2 where it is seen to include four data words. A first word is an identity word 23 including an address designating a particular vehicle. A second word 24 and a third word 25 form a speed control command to control the acceleration and braking mechanism of the addressed vehicle. A fourth word 26 includes discrete signals to operate doors and other apparatus on the addressed vehicle.

The computers 41, 43 and 44 are similar in construction and the typical component parts of the computers are shown for the supervisor computer 41. The computer is comprised of an arithmetic and logic unit 51 (ALU 51), controlled by a program control 52 and cooperating with a memory 53. The transfer of data between memory 53 and devices peripheral to the computer 41 is initiated under program control through I/O logic 55 which connects to corresponding circuitry of the safety computers 43 and 44, the on-line storage unit 46 and an operator console 50. The on-line storage unit 46, typically a magnetic disc storage unit, provides a large storage capacity for pre-calculated tables of vehicle parameters. The use of such tables to ascertain vehicle parameters reduces the calculation load on the computers, it being understood that a table look-up can be accomplished much quicker than involved calculations pertaining to the velocity, forward clearance, relative velocity and stopping distance of vehicles. This efficient use of computer processing time reduces the computation time required for each iteration of programs and enables the described vehicle transportation system to be controlled on a real-time basis by increasing the number of program iterations possible in a given period of time. The operator console 50 includes a CRT display 56 for monitoring the operation of the automatically controlled vehicles and a keyboard entry 57 for manual insertion of control data and initilization of the vehicles 10 in transit on the route plan.

Referring now to FIG. 3, there is shown a schematic representation of an on-line vehicle control system including communications and control equipment on each of the vehicles 10 shown in FIG. 1. Vehicle command messages transmitted from the central control station 31 shown in FIG. 1 are received by an antenna 61 connecting to a receiver 62. The receiver 62 demodulates, filters and amplifies the received signals before serially transferring such signals to an input register 63. A sync control circuit 64 connecting to the receiver 62 monitors the transfer of data through the receiver 62 and the sync control circuit 64 provides shift pulses to the input register 63 to coincide with the flow of data through the receiver 62. The sync control circuit 64 additionally connects to an address recognition logic 65 which compares the identity word 23 of a vehicle command message 22 shown in FIG. 2 to a preset logic pattern stored therein. If the two binary signal patterns match, a signal to the sync control circuit 64 enables the transfer of subsequent words in the vehicle command message from receiver 62 to the input register 63. However, if such comparison is not favorably made by the address recognition logic 65, a signal to the sync control circuit 64 inhibits the transfer of subsequent data from the receiver 62 to the input register 63.

Each word received by input register 63 is validated by a connecting data verification logic 66 which parity checks the word by requiring only two one bits in a string of five bits. Upon validation of the input word by the data verification logic 66, subsequent words of the vehicle command message are passed through a decoding matrix 67 and strobed into a first register 68, a second register 69 and a third register 70, in that order, by the sync control circuit 64. The data stored in registers 68 and 69 is inputted to a speed control unit 71 which controls the acceleration and braking of the vehicle in accordance with the stored input data. The data strobed into register 70 is outputted to vehicle apparatus 72 wherein the signals are used to control such items as the opening and closing of doors, the operation of a loudspeaker system, visual signals for passengers and other vehicle apparatus.

Referring momentarily to FIG. 4, there is shown a vehicle telemetry device 74 including a coded disc 75 of approximately 3 inches in diameter and mounted on an axle 76 common to a drive wheel of the vehicle so that any rotation of the wheel axle 76 producing movement of the vehicle would also produce a rotation of the coded disc 75. Around the outer edge of the coded disc 75 there are a plurality of evenly spaced indentations 77 approximately 0.2 inches square and located at 15° intervals around the circular edge of the coded disc 75. Adjacent to the coded disc is a variable reluctance pick-up device including a magnet 79 producing a magnetic field that extends to the coded disc 75 and an adjacent ferromagnetic core 80. The ferromagnetic core 80 is spaced about 0.01 inches from the extremity of the coded disc 75 and the core 80 is wound with a pick-up coil 81. The rotation of the coded disc 75 causes the indentations 77 to intermittently pass beneath the core 80 thereby distorting the field projected by magnet 79 and producing corresponding pulse signals on pick-up coil 81. The signal pulses on coil 81 are indicative of the rotational movement of the coded disc 75 which is indicative in turn of the incremental movement of the vehicle, each pulse corresponding to a vehicle movement of approximately 0.4 inches. These increment signals from the pick-up coil 81 are amplified by an amplifier 82.

Referring again to FIG. 2, the telemetry pulse signals from telemetry device 74 indicating movement of the vehicle are counted by a distance counter 86. The stored count of the distance counter 86 representing the total count of the increment signals received from telemetry device 74 and the output of counter 86 is parallel connected to a marker record register 89 and an assembly register 88. Signals transmitted from signalling markers 18 (shown on FIG. 1) are received by an antenna 90 and connecting marker receiver 91 which filters and amplifies a received pulse signal. A marker gate circuit 92 receives the marker signal from the marker receiver 91 and the telemetry pulse signal from telemetry device 74. Should the two signals appear concurrently, the marker signal is delayed by the marker gate circuit 92. The gated marker signal strobes the marker record register 89 to store the count from distance counter 86 into the marker record register 89, thereby recording the content of distance counter 86 when a signal was received by marker receiver 91. The marker gate circuit 92 delays the marker signal if it should occur simultaneously with the telemetry pulse signal from telemetry device 74 so that the distance counter 86 is not in a state of transition when its contents are strobed into the marker record register 89. In addition, the gated marker signal sets a marker indicator 93 which changes its output each time it receives a gated marker signal input. A vehicle status circuit 95 includes test circuitry verifying that vehicle doors are closed, brakes operative and the vehicle performing normally in all other respects. Signals from the vehicle status circuit 95 include contact closures and such signals are buffered in a signal adapter 96 for input to the assembly register 88. The assembly register 88 also receives signal inputs from the address recognition logic 65 corresponding to the identity word of the previously received vehicle command message which word includes the vehicle address.

When a vehicle command message has been received by the vehicle, the sync control circuit 64 initiates the transfer of a return message from the vehicle to the central control station 31 by strobing the assembly register 88 so that signal inputs from the address recognition logic 65, the distance counter 86, the marker record 89, the marker indicator 93, and the signal adapter 96 are stored in the assembly register 88. The strobe pulse from the sync control circuit 64 to the assembly register 88 is gated to occur only during such times when the distance counter 86 and the marker record 89 are stabilized. The contents of assembly register 88 form a vehicle performance report message 29 shown in FIG. 2 which includes the identity word 23 received in the vehicle command message 22, a distance count field 58 strobed from the marker record 89, an indicator field 60 strobed from the marker indicator 93 and a status field 83 strobed from the signal adapter 96. The vehicle performance report message 29 is then serially shifted past a parity generator 97 to a transmitter 98 and connecting antenna 99 for transmission to the central control station 31 shown on FIG. 1. The parity generator 97 adds parity digits to the transmitted message that is verified by the receiving equipment.

Referring again to FIG. 1, the programmed operation of the supervisor computer 41 will be described with reference to the system flow charts shown in FIG. 5 and the message formats shown in FIG. 2. The flow charts shown in FIG. 5 describe the computer program executed by the program control unit 52 repetitively as each of the vehicles 10 periodically communicate with the central control station 31. Vehicle performance report messages 29 received by the data buffer 36 from each of the vehicles 10 are transferred to safety computers 43 and 44 where the messages are validated by comparing the identity word 23 with the identity word 23 in the transmitted vehicle command message 22, the fields are separated, and the data is formatted and stored in the on-line storage unit 46. The supervisor computer 41 reads into its memory the fields of stored data from the vehicle tables in storage unit 46 as indicated in block 101. Included in such data are prior computed vehicle positions mathematically slotted on a simulated map of the route plan maintained in the bulk memory of storage unit 46. In lock 102 the computer calculates the change of the count stored in the distance counter 86 since the prior computation of the vehicle's position. The present position of the vehicle on the route plan is computed in block 102 by adding the incremental distance represented by the change in the counter to the vehicle's prior computed position. Jump block 103 tests the marker indicator field 60 to ascertain if the vehicle has passed a marker 18 since the transfer of its last performance report message 29. If the reporting vehicle has passed a marker 18, the program proceeds to block 104 which corrects the calculated position of the vehicle by subtracting the marker count field 59 from the distance count field 58 and computes the vehicle's distance from the fixed position of marker 18 using the difference between the two count fields 59 and 58. If the vehicle 10A, for example, had not passed the marker 18, the program skips block 104 and the computer proceeds to determine if the vehicle is within a limiting proximity of a restriction along the route plan preceding the vehicle, the location of such restrictions are logged in the simulated route plan maintained in memory storage unit 46. For example, in block 105 the vehicle's proximity to the proceeding vehicle 10B is computed and compared to a stored range limiting value to determine if the vehicles 10A and 10B are within such range. If it is within this limiting range, vehicle 10B is a speed limiting restriction to vehicle 10A and the computed proximity to the preceding vehicle is stored in block 106 and a PVL flag is set in block 107. If a negative response is made in block 105, the program goes directly to block 110 where the vehicle's position is tested to ascertain if it is within a predetermined limit range to a station. An affirmative response causes the SAL flag to be set in block 111 and a negative determination causes the program to go directly to block 112. In block 112 the vehicle's position is tested to ascertain if it is within a predetermined limit range to a guideway switch. An affirmative answer causes the GSL flag to be set in block 113 and a negative response causes the program to go directly to block 114 where the velocity of the vehicle is computed using the previously calculated change in the vehicle's position. The calculation of the vehicle's velocity from the periodic calculation of the vehicle's position is made with the elapsed time between position calculations ascertained by counting period clock pulses occurring every millisecond from the timer 48. Acceleration is computed in block 115 using the previously computed vehicle velocity. In block 116 both the computed velocity and the computed acceleration are tested to ascertain if they are consistent with previously issued commands from the central control station to the vehicles 10. A negative response to the test causes the program to skip to an alarm routine which is designed to fail-safe the system by keeping the proceeding vehicle 10B well ahead of vehicle 10A and slowing down vehicle 10A. An affirmative response causes the program to jump to block 120 to determine if any special functions such as launching or deleting the vehicle from the route path are required. If special functions have been requested for the vehicle, the SPLF flag is set in block 122 and the program then proceeds to block 123. In the event that special functions are not required, the program proceeds to block 121 where a command velocity ($V_C$) for the vehicle on the route plan is retrieved from table storage in on-line storage unit 46. The program then proceeds to block 123 where the service console displays and controls are serviced as required.

Figure 6:
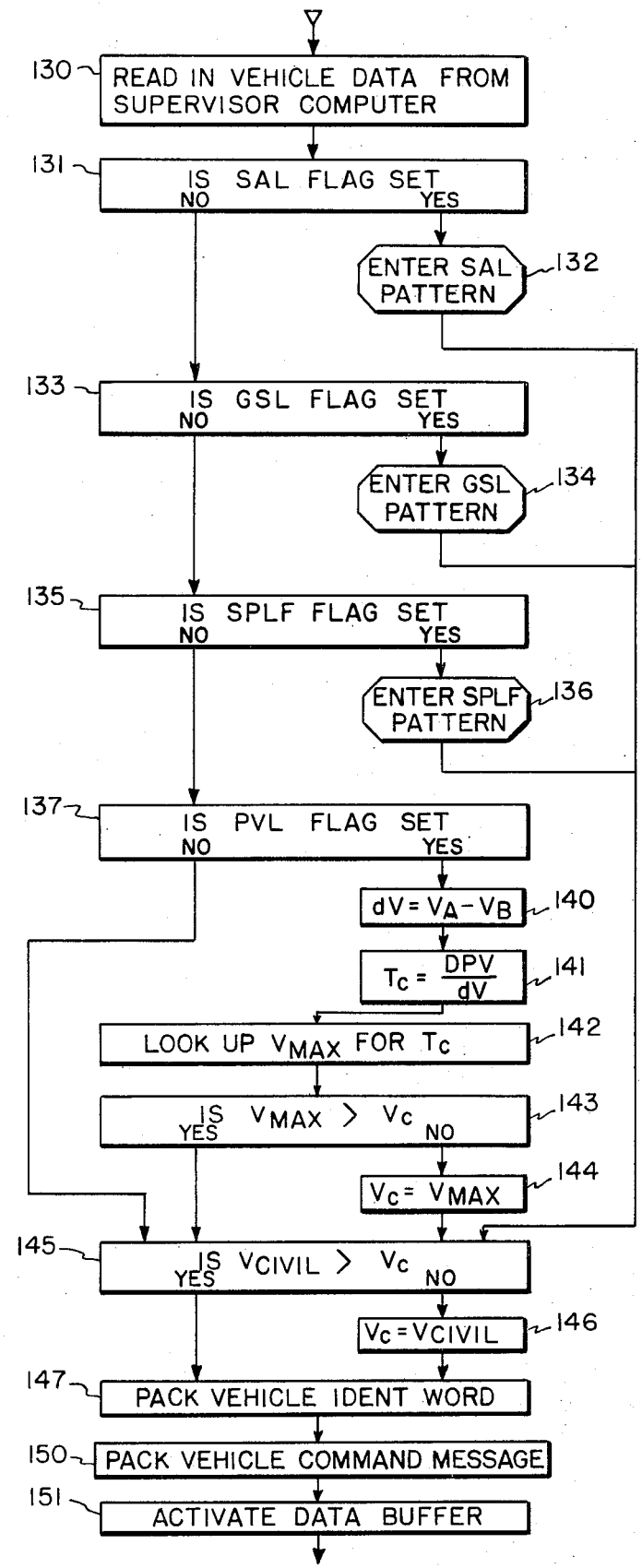
FIG. 6 is an illustrative flow chart of the programmed operation of the safety computers in the central control station.

Still referring to FIG. 1, the programmed operation of the safety computers 43 and 44 will be described with reference to system flow charts shown in FIG. 6. The flow charts shown in FIG. 6 describe the computer programs executed by each of the safety computers 43 and 44 repetitively as each of the vehicles 10 periodically communicate with the central control stations 31.

The safety computer programs are directed to limiting the velocity of the vehicle in accordance with certain physical constraints in the environment surrounding the vehicle such as its proximity to a station area, or to a guideway switch or to a preceding vehicle. The two safety computers 43 and 44 operate in an essentially parallel manner to provide a validating test on the computational veracity of each of the computers in the event either of the computers would malfunction in such a way that the malfunction was not easily detected, for example, if it only affected a few digits of a computed value. The safety computers 43 and 44 read into their memory units the vehicle data computed by the supervisor computer 41 as indicated in block 130. In block 131 the SAL flag is tested. If the SAL flag is present, the program enters an SAL routine 132 which directs the vehicle on a preset pattern to enter a station area. If the SAL flag has not been set, the GSL flag is tested in block 133. If the GSL flag is set, the program enters a GSL routine 134 which directs the vehicle on a preset pattern for passing a guideway switch. If the GSL flag has not been set, the SPLF flag is tested in block 135. If the SPLF flag is set, the program enters an SPLF routine 136 where the vehicle is directed to proceed in accordance with preset patterns for the designated special function. In the event the SPLF flag is not set, the program proceeds to block 137 where the PVL flag is tested. If the PVL flag has been set, the program proceeds to block 140 where the difference in the velocity of vehicle 10A and the velocity of preceding vehicle 10B is computed. The difference in velocities between the two vehicles 10A and 10B, for example, is used to project a forward safety zone in front of vehicle 10A that limits or extends the maximum velocity the vehicle could travel if the vehicle were controlled only on a preset pattern. For example, if the vehicles 10A and 10B were travelling at the same velocity, a forward safety zone 15 extends from vehicle 10A and reaches almost to vehicle 10B. If vehicle 10A were travelling at a velocity less than the velocity of vehicle 10B, then vehicle 10A would require a shorter stopping distance than vehicle 10B and an extended forward safety zone 16 from vehicle 10A actually appears to overlap vehicle 10B. Conversely, if vehicle 10A were travelling at a velocity less than the velocity of vehicle 10B, a contracted forward safety zone 17 would be more limited in range as shown in FIG. 1. The range of the forward safety zone corresponds to a time to collision $T_C$ that is computed in block 141 by dividing the distance between vehicle 10A and 10B by the difference in the vehicles' velocities. It should be noted that the sign of $T_C$ changes in accordance with the relative velocities of the two vehicles, i.e., which vehicle 10A or 10B has a greater velocity. In block 142, a $V_{MAX}$ value is retrieved from a vehicle data table in the on-line storage unit 46 corresponding to the computed $T_C$. In block 143, the value of $V_{MAX}$ is compared with the command velocity referenced in block 121 of FIG. 5. If $V_{MAX}$ is greater than $V_C$, the program proceeds to block 145, otherwise the program proceeds to block 144 where $V_C$ is made equal to $V_{MAX}$. It should be noted that entry to block 145 can be made directly from SAL routine 132, GSL routine 134, SPLF routine 136 and block 137 as indicated in the flow chart. In block 146 a civil velocity limit $V_{Civil}$ imposed on sections of the route plan is compared with the command velocity $V_C$. It should be noted that different values of the civil velocity limit are imposed on different sections of the route plan and such values can easily be changed by entry of data on keyboard 57. If $V_{Civil}$ is greater than $V_C$, the program proceeds to block 146 where $V_C$ is made equal to $V_{Civil}$. If $V_C$ is less than $V_{Civil}$, the program proceeds directly to block 150. In blocks 150 and 151, the vehicle command message 22 shown in FIG. 2 is formatted and packed for transfer to data buffer 36. Each of the safety computers 43 and 44 are programmed in accordance with the flow charts of FIG. 6 to independently compute speed control commands that are transferred to data buffer 36 and merged in register 37 for transfer to one of the vehicles 10.

The operation of the automatic vehicle control system will now be described with reference to the block diagram of FIG. 1, the message formats shown in FIG. 2 and the schematic representation of the control system on-board each of the vehicles 10 shown in FIG. 3. Vehicle command messages 22 are transferred from the computer set 40 through the data transfer buffer 36, the transmitter 34 and data transfer line 27 and are received by vehicles 10A, 10B and 10C. The identity word 23 of the command message 22 is entered into input register 63, validated by the connecting data verification logic 66, and compared by the address recognition logic 65 to the preset logic pattern stored therein. A favorable comparison can only be made by the vehicle 10A, for example, and vehicles 10B and 10C will ignore further transmission of data included in the command message 22. Subsequent words 24, 25 and 26 received by vehicle 10A are validated by the data verification logic 66, passed through the decoding matrix 67 and strobed into registers 68, 69 and 70, in that order, by the sync control circuit 64.

The sync control circuit 64 responds to the receipt of the vehicle command message 22 in vehicle 10A by initiating a performance report message 29. The sync control circuit 64 strobes the assembly register 88 to store therein signal inputs from the address recognition logic 65, the distance counter 86, the marker record 89, the marker indicator 93, and the signal adapter 96. The sync control circuit 64 then initiates the serial shifting of data stored in assembly register 88 past the parity generator 97 to a transmitter 98. The parity generator 97 adds parity bits as the performance report 29 is transmitted to the central control station 31.

The performance report message from vehicle 10A is conveyed on data transfer line 27, decoded by receiver 33, parity checked and formatted in data transfer buffer 36 and inputted to safety computers 43 and 44 where the data is validated by comparing the received identity word 23 with the identity word 22 in the previously transmitted vehicle command message 22. The stored vehicle data is then processed by the supervisor computer 41 in accordance with the computer program previously described with reference to the flow charts depicted in FIG. 5. The computed results from the supervisor computer 41, including a command velocity $V_C$ and a plurality of limit flags, are stored in on-line storage unit 46, where such data is subsequently retrieved by safety computers 43 and 44. The processing in the safety computers 43 and 44 limit the velocity of the vehicle in accordance with the physical constraints in the environment surrounding the vehicle such as its proximity to a station area or a guideway switch or to a preceding vehicle. The two safety computers 43 and 44 provide a validating check on each other by operating in an essentially parallel manner. The safety computers 43 and 44 read into their memories the vehicle data computed by the supervisor computer 41 and the program controlled computer processes the data in accordance with the flow charts shown in FIG. 6 to form a vehicle command message that is subsequently transmitted to the vehicle 10A with an appropriate identity word for that vehicle. It should now be understood that the safety computers 43 and 44 act to limit or decrease the command velocity of the vehicle from an optimum command velocity obtained from the supervisor computer 41. However, should either one of these computers fail to operate properly so that inconsistent data from each of the computers 43 and 44 were merged to form a vehicle command message 22, the data verification logic 66 would reject the transmitted erroneous word. In this manner, a fail-safe feature is provided by the described parallel operation of safety computers 43 and 44 concurrently computing a limiting command velocity for the vehicle.

Control of each of the vehicles 10A, 10B and 10C and the transfer of data between the vehicles and the central control station 31 is performed similar to the above described operation. The identity word 23 associated with each of the vehicles 10A, 10B and 10C are, of course, different. In the disclosed system the transmission of a vehicle command message to vehicle 10B, for example, is synchronized to correspond with the transfer of a vehicle performance report message from vehicle 10A. This bidirectional simultaneous transfer of data is used to match the speed of transmitting data to the relatively higher computational speed of the computer set 40.

While there has been described what at present is considered to be the preferred embodiment of the present invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. An automatic vehicle control system for a plurality of vehicles traveling along path rails in a route plan and controlled from a central control station, a plurality of signalling markers spaced along the rails in the route plan, a marker receiver included on each vehicle to receive a marker signal when the vehicle's position traveling along a path rail is concurrent with the location of a signalling marker, a data communication link between said vehicles and said central control station for transferring vehicle performance reports from each of said vehicles to the central control station and transferring vehicle command messages from the central control station to each of said vehicles, an on-line control system in each of said vehicles for decoding vehicle command messages and assembling performance report messages, and a speed control unit in each of said vehicles acting in response to the vehicle command message decoded by the on-line vehicle control system for controlling acceleration and braking of the vehicle, wherein the improvement comprises:

a computer set in said central control station providing means for computing speed control commands for said vehicles;

a data transfer buffer connecting to said computer set providing means for assembling the vehicle command message for transfer to said vehicles;

an identity word for addressing a selected one of said vehicles and a computed speed control command for the addressed vehicle included in said vehicle command message;

an input register in said on-line control system for receiving the vehicle command messages transferred from the central control station to the vehicles;

an address recognition means connecting to said input register for testing said identity word, said address recognition means recognizing vehicle command messages intended for the receiving selected vehicle among said plurality of vehicles, a word storage means connecting to said speed control unit for storing portions of said vehicle command messages;

a sync control circuit in said on-line control system providing means for synchronizing the transfer of the vehicle command message from said data communication link to said input register with the testing of said identity word by said address recognition means and with the transfer of portions of said vehicle command message into said word storage means.

2. The automatic vehicle control system of claim 1 wherein said on-line control system includes:

an assembly register for assembling a vehicle performance report for transfer of said assembled vehicle performance report from the vehicle to said central control station; and said sync control circuit including further means for gating the identity word recognized by said address recognition means to said assembly register for transfer in said assembled vehicle performance report to said central control station.

3. The automatic vehicle control system of claim 2 wherein said central control station provides means for verifying that the identity word received from the vehicle is the same identity word previously transferred to the vehicle in said vehicle command message.

4. The automatic vehicle control system of claim 2 wherein said sync control circuit assembles said vehicle performance report in said assembly register for transfer to said central control station in response to the receipt of a vehicle command message recognized by said address recognition means and intended for the receiving selected vehicle.

5. The automatic vehicle control system of claim 2 wherein said on-line control system includes:

a vehicle telemetry device producing telemetry pulse outputs corresponding to movement of the vehicle along said path rails;

a distance counter to maintain a distance count by recording the number of telemetry pulse outputs generated by said vehicle telemetry device; and said sync control circuit including further means for gating the stored contents of said distance counter into said assembly register for transfer in said assembled vehicle performance report to said central control station.

6. The automatic vehicle control system of claim 5 wherein said on-line control system includes:

a marker register connected to said distance counter and responsive to a marker signal from said marker receiver to strobe a marker count from said distance counter into said marker register; and said sync control circuit including further means for gating the stored contents of said marker register into said assembly register for transfer in said assembled vehicle performance report to said central control station.

7. The automatic vehicle control system of claim 6 wherein said on-line control system includes:

a marker gate interposed between said marker receiver and said marker register to delay the marker signal when it occurs concurrently with a telemetry pulse from said telemetry device.

8. The automatic vehicle control system of claim 6 wherein said computer set provides means for computing the vehicle's position beyond said marker location by subtracting said marker count from said distance count in said assembled vehicle performance report.

9. The automatic vehicle control system of claim 1 wherein:

said computer set provides means for computing the position of said vehicles along said path rails in said route plan, said computer set providing further means for storing the position of said signalling marker along said path rails in said route plan, and said computer set providing additional means to compute the distance from said vehicles to said signalling marker along said path rails in said route plan.

10. The automatic vehicle control system of claim 9 wherein said computer set provides further means for computing the distance between each of said vehicles along said path rails in said route plan.

11. The automatic vehicle control system of claim 1 wherein:

a supervisor computer included in said computer set provides means for computing a position for each of said vehicles along said path rails in said route plan, and said supervisor computer provides means for setting limit flag signals for each of said vehicles in accordance with the computed positions of said vehicles.

12. The automatic vehicle control system of claim 11 wherein:

a first safety computer and a second safety computer are included in said computer set, said first and second safety computers programmed to independently compute speed control commands for each of said vehicles in accordance with limit flag signals set by said supervisor computer;

a register in said data transfer buffer for storing said vehicle command messages for transfer to said vehicles; and said first safety computer and said second safety computer outputting speed control commands for each of said vehicles into said register to form a vehicle control message for transfer to said vehicles.

13. An automatic vehicle control system for a plurality of vehicles travelling along path rails in a route plan and controlled from a central control station, a plurality of signalling markers spaced along the rails in the route plan, a marker receiver included on each vehicle to receive a marker signal when the vehicle's position travelling along a path rail is concurrent with the location of signalling marker, a data communication link between said vehicles and said central control station for transferring vehicle performance reports from each of said vehicles to the central control station and transferring vehicle command messages from the central control station to each of said vehicles, an on-line control system in each of said vehicles for decoding vehicle command messages and assembling performance report messages, and a speed control unit in each of said vehicles acting in response to the vehicle command message decoded by the on-line vehicle control system for controlling acceleration and braking of the vehicle, wherein the improvement comprises:

a computer set in said central control station providing means for computing speed control commands for said vehicles;

a data transfer buffer connecting to said computer set providing means for assembling the vehicle command messages for transfer to said vehicles;

a supervisor computer included in said computer set providing means for computing a position for each of said vehicles along said path rails in said route plan;

said supervisor computer providing further means for setting limit flag signals for each of said vehicles in accordance with the computed positions of said vehicles;

a first safety computer and a second safety computer included in said computer set, said first and second safety computers programmed to independently compute speed control commands for each of said vehicles in accordance with limit flag signals set by said supervisor computer;

a register in said data transfer buffer for storing said vehicle command messages for transfer to said vehicles; and said first safety computer and said second safety computer outputting speed control commands for each of said vehicles into said register to form a vehicle control message for transfer to said vehicles.

14. The automatic vehicle control system of claim 13 wherein:

said supervisor computer provides means for storing the position of said signalling marker along said path rails in said route plan and provides further means for computing the distance from said vehicles to said signalling marker along said path rails.

15. The automatic vehicle control system of claim 13 wherein said supervisor computer provides means for computing the distance between each of said vehicles along said path rails in said route plan.

16. The automatic vehicle control system of claim 15 wherein:

said supervisor computer provides programmed means for computing the velocity of said vehicles by periodically computing the position of said vehicles, and said first and second safety computers provide additional programmed means for computing a maximum safe vehicle velocity for one of said vehicles that is preceded by a second of said vehicles where said maximum safe vehicle velocity is limited by the distance between said first and second vehicles and the relative velocities of said first and second vehicles.

17. The automatic vehicle control system of claim 13 wherein said data transfer buffer connects to said first and second safety computer and said vehicle command message is assembled in said data transfer buffer by merging output signals from each of said first and second safety computers.

18. An automatic vehicle control system for a plurality of vehicles travelling along a path rail in a route plan and controlled from a central control station, a speed-limiting restriction located along said route plan, a data communication link between said vehicles and said central control station for transferring vehicle performance reports from each vehicle to the central control station and vehicle command messages from the central control station to the vehicles, a distance count indicating increments of distance travelled by said vehicles along the path rail included in each of said vehicle performance reports, an on-line control system in each of said vehicles for decoding said vehicle command messages and assembling said performance report messages, a speed control unit acting in response to the vehicle command messages decoded by said on-line vehicle control system for controlling acceleration and braking of each of said vehicles, wherein the improvement comprises:

a computer set in said central control station providing means for calculating the position of each of said vehicles on the route plan and means for computing a command velocity for each vehicle;

said computer set receiving vehicle performance reports from said vehicles and preparing vehicle command messages for transfer to said vehicles;

a supervisor computer and a safety computer operatively connected to each other in said computer set, said supervisor computer providing programmed means for utilizing said distance count included in said vehicle performance report for computing the position of said vehicles in said route plan, said supervisor computer providing further programmed means for computing a command velocity for each of said vehicles on said route plan;

said supervisor computer providing further programmed means for setting a limit flag signal when a first of said vehicles is within a limiting proximity of said speed-limiting restriction along the route plan, and said safety computer providing programmed means for limiting the command velcoity for said first vehicle in response to said limit flag signal set by said supervisor computer.

19. The automatic vehicle control system of claim 18 wherein:

said speed-limiting restriction located along said route plan is a second of said vehicles preceding said one vehicle along said route plan, and said limit flag signal is set by said supervisor computer when said first vehicle is within the limiting proximity of said second vehicle.

20. The automatic vehicle control system of claim 18 wherein:
said supervisor computer provides further programmed means for computing the velocity of each of said vehicles by periodically computing the position of each of said vehicles, and
said safety computer provides programmed means utilizing said computed vehicle velocities computed by said supervisor computer for computing a forward safety zone preceding each of said vehicles.

21. The automatic vehicle control system of claim 20 wherein said forward safety zones computed for each of the said vehicles by said safety computer is extended when the velocity of said preceding vehicle is greater than the velocity of said reporting vehicle, and
said forward safety zone is contracted when the velocity of said preceding vehicle is less than the velocity of said reporting vehicle.

* * * * *